US010102086B2

(12) United States Patent
Cai

(10) Patent No.: US 10,102,086 B2
(45) Date of Patent: Oct. 16, 2018

(54) REPLICATED DATABASE DISTRIBUTION FOR WORKLOAD BALANCING AFTER CLUSTER RECONFIGURATION

(71) Applicant: Futurewei Technologies, Inc., Plano, TX (US)

(72) Inventor: Le Cai, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 226 days.

(21) Appl. No.: 14/577,629

(22) Filed: Dec. 19, 2014

(65) Prior Publication Data

US 2016/0179642 A1  Jun. 23, 2016

(51) Int. Cl.
*G06F 11/20* (2006.01)
*H04L 29/08* (2006.01)
(Continued)

(52) U.S. Cl.
CPC ........ *G06F 11/2033* (2013.01); *G06F 9/5083* (2013.01); *G06F 11/2023* (2013.01);
(Continued)

(58) Field of Classification Search
CPC .... G06F 9/466; G06F 9/5072; G06F 11/1417; G06F 11/1464; G06F 11/1425; G06F 11/2097
See application file for complete search history.

(56) References Cited

U.S. PATENT DOCUMENTS 5,678,061 A * 10/1997 Mourad .............. G06F 11/2094
                                                    348/E7.073
8,392,482 B1 * 3/2013 McAlister ......... G06F 17/30584
                                                    707/771
(Continued)

FOREIGN PATENT DOCUMENTS

CN    102882981 A    1/2013
CN    103312825 A    9/2013
(Continued)

OTHER PUBLICATIONS

"International Application Serial No. PCT/CN2015/097350, Internatonal Search Report dated Mar. 1, 2016", 6 pgs.
(Continued)

*Primary Examiner* — Jigar Patel
(74) *Attorney, Agent, or Firm* — Schwegman Lundberg & Woessner, P.A.

(57) ABSTRACT

A computer-implemented method for distributing a plurality of data partitions among a cluster of computer nodes includes dividing a database into a plurality of primary partitions, storing the primary partitions on a plurality of nodes associated with a computer network, duplicating the primary partitions to create a plurality of secondary partitions and storing the secondary partitions on the nodes, wherein the primary and secondary partitions are substantially evenly distributed among the nodes, each secondary partition is stored on a different node than its corresponding primary partition, diversity exists with respect to each sec-
(Continued)

ondary partition and the node where it is stored, the primary partitions are available to serve a system workload, and one or more secondary partitions corresponding to one or more primary partitions of a failed node are available to be upgraded to primary status to maintain workload balancing and data availability after one of the computer nodes fails.

19 Claims, 9 Drawing Sheets

(51) Int. Cl.
*G06F 9/50* (2006.01)
*G06F 17/30* (2006.01)

(52) U.S. Cl.
CPC ...... *G06F 11/2035* (2013.01); *G06F 11/2048* (2013.01); *G06F 11/2058* (2013.01); *G06F 17/30584* (2013.01); *H04L 67/1008* (2013.01); *H04L 67/1034* (2013.01); *H04L 67/1095* (2013.01); *H04L 67/1097* (2013.01); *G06F 11/2094* (2013.01); *G06F 11/2097* (2013.01); *G06F 2201/805* (2013.01); *G06F 2201/86* (2013.01)

(56) References Cited

U.S. PATENT DOCUMENTS

| | | | |
|---|---|---|---|
| 2008/0151890 A1 | 6/2008 | Zelig et al. | |
| 2008/0288563 A1* | 11/2008 | Hinshaw | G06F 17/30575 |
| 2010/0293334 A1* | 11/2010 | Xun | G06F 17/30949 |
| | | | 711/129 |
| 2012/0297056 A1 | 11/2012 | Lee et al. | |
| 2012/0311295 A1* | 12/2012 | Gaur | G06F 9/5072 |
| | | | 711/173 |
| 2013/0290249 A1* | 10/2013 | Merriman | G06F 17/30584 |
| | | | 707/610 |
| 2014/0201541 A1 | 7/2014 | Paul et al. | |

FOREIGN PATENT DOCUMENTS

| | | |
|---|---|---|
| CN | 103530317 A | 1/2014 |
| CN | 103929467 A | 7/2014 |
| CN | 104123300 A | 10/2014 |

OTHER PUBLICATIONS

"International Application Serial No. PCT/CN2015/097350, Written Opinion dated Mar. 1, 2016", 5 pgs.

"European Application No. 15869298.8, Extended European Search Report dated Dec. 11, 2017", (Dec. 11, 2017), 9 pgs.

* cited by examiner

| NODE | PRIMARY | | | | SECONDARY | | | |
|---|---|---|---|---|---|---|---|---|
| N1 | 1 | 9 | 17 | 25 |   | 5 | 12 | 19 | 24 | 26 |
| N2 | 2 | 10 | 18 | 26 |   | 6 | 13 | 20 | 25 | 27 |
| N3 | 3 | 11 | 19 | 27 |   | 7 | 14 | 18 | 21 | 28 |
| N4 | 4 | 8 | 12 | 20 | 28 | 15 | 22 | 29 | 32 |   |
| N5 | 5 | 13 | 16 | 21 | 29 | 1 | 4 | 11 | 23 | 30 |
| N6 | 6 | 14 | 22 | 30 | 24 | 2 | 8 | 9 | 31 |   |
| N7 | 7 | 15 | 23 | 32 | 31 | 3 | 10 | 16 | 17 |   |

FIG. 4

| Step | partition | placement | degree N1 N2 N3 N4 N5 N6 N7 N8 |
|------|-----------|-----------|--------------------------------|
| | | | 0 0 0 0 0 0 0 0 |
| 1 | 8 | N4→N6 | 0 0 0 1 0 1 0 0 |
| 2 | 16 | N5→N7 | 0 0 0 1 1 1 1 0 |
| 3 | 24 | N6→N1 | 1 0 0 1 1 2 1 0 |
| 4 | 32 | N7→N4 | 1 0 0 2 1 2 2 0 |
| 5 | 4 | N4→N5 | 1 0 0 3 2 2 2 0 |
| 6 | 11 | N3→N5 | 1 0 1 3 3 2 2 0 |
| 7 | 18 | N2→N3 | 1 1 2 3 3 2 2 0 |
| 8 | 25 | N1→N2 | 2 2 2 3 3 2 2 0 |

FIG. 5

REPLICATED DATABASE DISTRIBUTION FOR WORKLOAD BALANCING AFTER CLUSTER RECONFIGURATION

TECHNICAL FIELD

This description relates generally to distributed databases, and more particularly to placement of replicated partitions of a distributed relational database on networked computer nodes.

BACKGROUND

Databases are used to store information and relations between pieces of information. Some databases are stored in a distributed file system on multiple computers connected by a network or multiple interconnected networks. Typically, the database is divided into partitions of equal, similar or dissimilar sizes and one or more partitions of informational data is stored in memory devices associated with multiple servers connected by a system of networks.

In some existing distributed file systems, such as a typical Hadoop distributed file system (HDFS) or a typical peer-to-peer (P2P) distributed file system, individual database files are divided into data blocks, which are distributed to multiple computer nodes in order to maintain data redundancy and achieve workload balance. Some existing distributed file systems utilize a relatively high number of nodes, including thousands of nodes, which varies over time as additional nodes are dynamically added to and dropped from the cluster. The computing nodes in these systems typically consist of commodity hardware, such as personal computers (PCs), and may include individual user systems. The existing approaches can achieve significant data redundancy and relatively high availability of data for throughput-oriented, large-scale, and loose-coupled distributed systems, such as HDFS and P2P distributed file systems.

Other existing distributed file systems, including massively parallel processing (MPP) database management systems, scale out by distributing data to a cluster or multiple clusters of relatively high-performance servers, such as data warehouse appliances, as well as by running individual computing transactions in parallel on multiple servers. MPP database systems typically include fewer nodes than HDFS or P2P distributed file systems, and the number of nodes in an MPP database system generally is relatively stable compared to HDFS or P2P. Thus, at times MPP database performance is dominated by slower individual nodes in the cluster of parallel processing computers. As a result, workload balance sometimes becomes the key factor in achieving both high throughput and low latency. In high-performance, server-based distributed file systems, even distribution of the data among the distributed server nodes generally can balance the workload, assuming the data on the individual nodes receives similar access to computing resources.

A typical MPP database cluster uses a "shared-nothing" storage architecture, wherein storage hardware, such as disk drives, is not shared between individual nodes in the cluster. In an MPP database system, data location information is unavailable at runtime. In addition, MPP database clusters increasingly utilize commodity hardware resources, such as PCs. Thus, if an individual server in the cluster should fail, the data stored on the failed server can become unavailable to the cluster. The design of high-availability MPP database systems requires that the cluster be capable of tolerating individual server failures while supporting continuous service without data loss. Data replication in multiple servers has been combined with failover procedures that can be conducted upon an individual server failure in order to achieve a general level of tolerance for server failures.

Furthermore, particularly with regard to node failure and during redundancy restoration, workload balance generally has not been given high design priority. For example, consistent hashing algorithms are often used to locate distributed and duplicated data in peer-to-peer distributed file systems. In consistent hashing algorithms the output range of a hash function is treated as a fixed circular space or ring (for example, the largest hash value wraps around to the smallest hash value). Each system node is assigned a value within this space, representing the node's position on the ring. Each data item is assigned to one of the nodes in the ring by hashing the identification or key associated with the data item to yield unique position on the ring, and then "walking" or moving clockwise around the ring to find the first server with a position larger than that of the item.

That is to say, each node becomes responsible for the region of the ring between the node and its predecessor node on the ring. Then, when a node fails, the corresponding workload is forwarded to the next server on the ring. Similarly, when a new node is added to the ring the node shares only the workload of the neighboring server in the ring, resulting in an unbalanced workload. While this sort of unbalanced workload may be reasonably well tolerated in a cluster that includes thousands of nodes, the same level of workload unbalance may have a considerably negative effect on performance in an MPP database. As a result, some existing file distribution methodologies can have drawbacks when used in MPP database systems, since both throughput and latency are of relatively high importance.

SUMMARY

According to one general aspect, a method includes dividing a database into a plurality of primary partitions, storing the primary partitions on a plurality of nodes associated with a computer network, wherein the primary partitions are substantially evenly distributed among the nodes and the primary partitions are available to serve a system workload, duplicating the primary partitions to create a plurality of secondary partitions, and storing the secondary partitions on the nodes, wherein the secondary partitions are substantially evenly distributed among the nodes, each secondary partition is stored on a different node than its corresponding primary partition, diversity exists with respect to each secondary partition and the node where it is stored, and one or more secondary partitions corresponding to one or more primary partitions of a failed node are available to be upgraded to primary status to maintain workload balancing and data availability after one of the computer nodes fails.

According to another general aspect, a computer program product for distributing a plurality of data partitions among a cluster of computer nodes includes a non-transitory, tangible computer readable storage medium having computer readable instructions embodied therein, the computer readable instructions adapted to be executed to implement dividing a database into a plurality of primary partitions, storing the primary partitions on a plurality of nodes associated with a computer network, wherein the primary partitions are substantially evenly distributed among the nodes and the primary partitions are available to serve a system workload, duplicating the primary partitions to create a plurality of secondary partitions, and storing the secondary partitions on the nodes, wherein the secondary partitions are substantially evenly distributed among the nodes, each secondary partition is stored on a different node than its corresponding primary partition, diversity exists with respect to each secondary partition and the node where it is stored, and one or more secondary partitions corresponding to one or more primary partitions of a failed node are available to be upgraded to primary status to maintain workload balancing and data availability after one of the computer nodes fails.

According to yet another general aspect, a device for distributing a plurality of data partitions among a cluster of computer nodes includes a partitioner configured to divide a database into a plurality of primary partitions, a replicator configured to duplicate the primary partitions to create a plurality of secondary partitions, and an initial distributor configured to store the primary partitions and the secondary partitions on a plurality of nodes associated with a computer network, wherein the primary partitions and the secondary partitions are substantially evenly distributed among the nodes, the primary partitions are available to serve a system workload, each secondary partition is stored on a different node than its corresponding primary partition, diversity exists with respect to each secondary partition and the node where it is stored, and one or more secondary partitions corresponding to one or more primary partitions of a failed node are available to be upgraded to primary status to maintain workload balancing and data availability after one of the computer nodes fails.

The details of one or more embodiments of the invention are set forth in the accompanying drawings and the description below. Other features, objects, and advantages of the invention will be apparent from the description and drawings, and from the claims.

DESCRIPTION OF THE DRAWINGS

FIG. 4 is a table representing a redistribution of primary partitions and secondary partitions after a node failure.

FIG. 5 is an array representing the degree of each computer node in a cluster.

DETAILED DESCRIPTION

Figure 1:
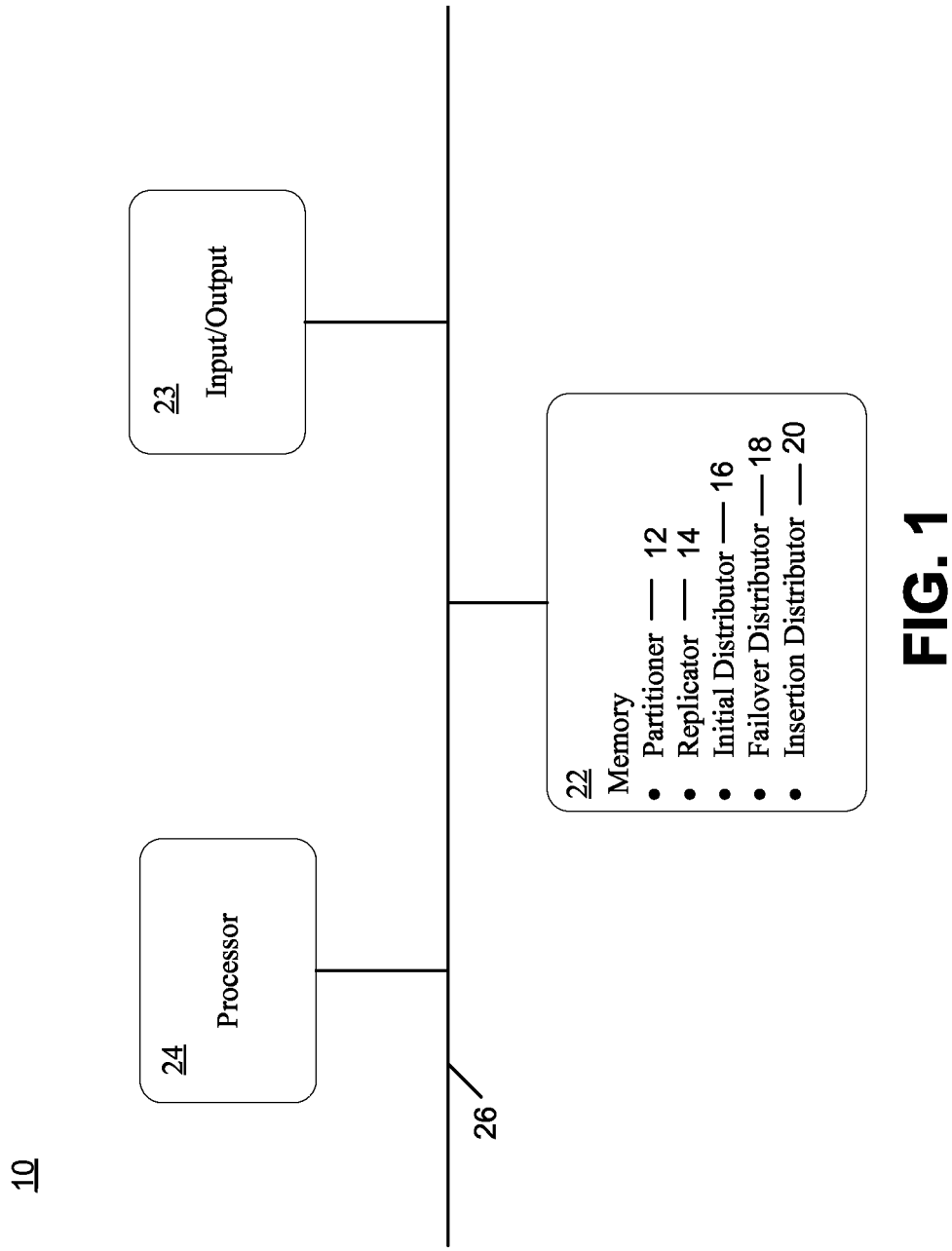
FIG. 1 is a schematic depicting a device for distributing data partitions among a cluster of computer nodes.

An embodiment in accordance with the present invention is shown in FIG. 1, which illustrates an apparatus 10 for partitioning, replicating and distributing information data associated with a database among multiple interconnected servers. The apparatus 10 can be implemented, for example, in one or more relational database management system coordinator nodes, data nodes, or any combination of these.

The apparatus 10 includes an input/output device 23, a memory 22 and a processor 24, all of which are interconnected by a data link 26. The memory 22 contains a partitioner 12, a replicator 14, an initial distributor 16, a failover distributor 18 and an insertion distributor 20.

Use of the apparatus 10 can result in improved workload balancing while maintaining data redundancy and providing high data availability with respect to existing file distribution systems. In particular, use of the apparatus 10 can result in improved workload balancing with respect to existing placement methods after an individual computer node failure or multiple node failures, or after another change in system capacity, such as the insertion of an additional node. As a result, the apparatus 10 can be used to significant advantage in massively parallel processing (MPP) database systems.

The partitioner 12 may divide, or partition, information data associated with a database into various data groupings, or partitions, of equal, similar or dissimilar sizes. For example, the partitioner 12 may utilize a hash function operating on a key value associated with each data item or segment of information in the database to create a unique identifier that further associates the data item or segment of information with an individual partition. In a preferred embodiment, the partitions are of relatively similar or nearly equal sizes.

The replicator 14 may duplicate any or all of the partitions to create a backup copy, or replica, of one or more of the partitions. The replicator 14 may further replicate any or all of the partitions to create additional backup replicas of one or more of the partitions. The initial distributor 16 may effect placement of the data partitions on multiple computer nodes upon initialization of the distributed database. If a computer node fails, the failover distributor 18 may redistribute the data partitions among the surviving nodes to achieve workload balancing. Similarly, if a node is added to the cluster of computers, the insertion distributor 20 may redistribute data partitions from the existing nodes to the newly added node to maintain even workload balance.

The input/output device 23, the memory 22 and the processor 24 may be part of a general computing device, such as a personal computer (PC), a server, or a mainframe computer. Peripheral components may include programming code, such as source code, object code or executable code, stored on a computer-readable medium that can be loaded into the memory 22 and executed by the processor 24 in order to perform the functions of the apparatus 10. Thus, in various embodiments, the functions of the apparatus 10 can be executed on any suitable processor, such as a server, a mainframe computer, a PC, a PDA, a collection of networked servers or PCs, or the like. Additionally, as modified or improved versions of the apparatus 10 are developed, for example, in order to revise or add a template or country-specific information, software associated with the processor may be updated.

In various embodiments, the apparatus 10 may be coupled to a communication network, which can include any viable combination of devices and systems capable of linking computer-based systems, such as the Internet; an intranet or extranet; a local area network (LAN); a wide area network (WAN); a direct cable connection; a private network; a public network; an Ethernet-based system; a token ring; a value-added network; a telephony-based system, including, for example, T1 or E1 devices; an Asynchronous Transfer Mode (ATM) network; a wired system; a wireless system; an optical system; a combination of any number of distributed processing networks or systems or the like.

The address data collection system 10 can be coupled to the communication network by way of the local data link 26, which in various embodiments can incorporate any combination of devices—as well as any associated software or firmware-configured to couple processor-based systems, such as modems, network interface cards, serial buses, parallel buses, LAN or WAN interfaces, wireless or optical interfaces and the like, along with any associated transmission protocols, as may be desired or required by the design.

An embodiment of the present invention can communicate information to the user and request user input, for example, by way of an interactive, menu-driven, visual display-based user interface, or graphical user interface (GUI). The user interface may be executed, for example, on a personal computer (PC) with a mouse and keyboard, with which the user may interactively input information using direct manipulation of the GUI. Direct manipulation can include the use of a pointing device, such as a mouse or a stylus, to select from a variety of selectable fields, including selectable menus, drop-down menus, tabs, buttons, bullets, checkboxes, text boxes, and the like. Nevertheless, various embodiments of the invention may incorporate any number of additional functional user interface schemes in place of this interface scheme, with or without the use of a mouse or buttons or keys, including for example, a trackball, a touch screen or a voice-activated system.

Figure 2:
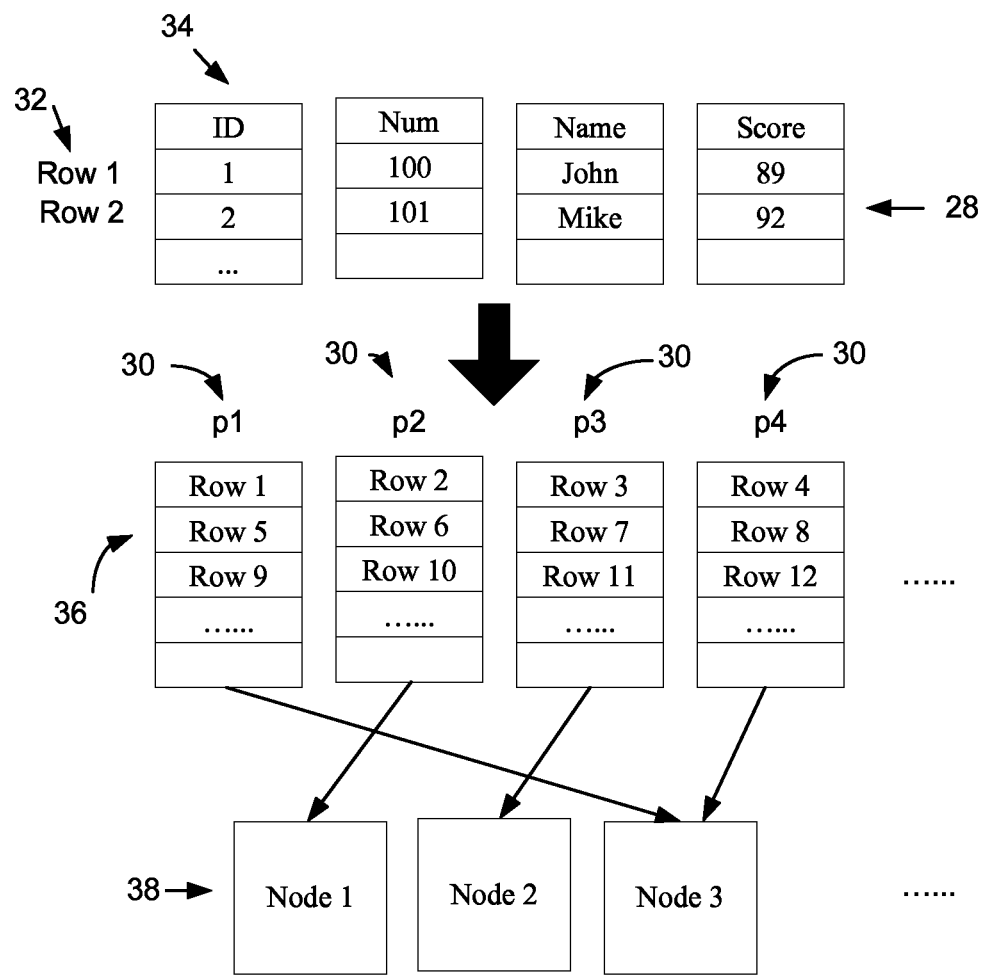
FIG. 2 is an illustration depicting the partitioning and distribution of database data partitions among a cluster of computer nodes.

Referring to FIG. 2, a database table 28 may be divided into various partitions 28 containing multiple rows 30 of fields from the database table 28, for example, by the partitioner 12 of FIG. 1. In this example, the partitioner 12 may use a hash function operating on the identification number (ID) 34 associated with each of the rows 30 to create a unique identifier that further associates each of the rows 30 of the database table 28 with one of the partitions 28 in a hash bucket. The approximately equally sized records of the database table 28 may be approximately evenly distributed among the various partitions 28 to create partitions 28 of approximately equal size. The partitions 28 may subsequently be placed, or distributed, among multiple nodes 28 of a computer cluster associated with the database.

In general, stored partitions that currently are serving the system workload at any given time, or that currently are available to serve the system workload, may be designated "primary" partitions. Stored backup replicas that currently are not serving the workload, or that currently are not available to serve the workload, may be designated "secondary" partitions. At any given time, any individual primary partition may correspond to multiple secondary partitions, or replicas.

In general, partitions may be distributed to computer nodes under one of three conditions: 1) upon initialization of the database, 2) after the failure of one or more nodes, or 3) upon insertion of an additional node or nodes into the cluster. The partition placement, or distribution, algorithm distributes the partitions among the nodes in a manner that balances the workload among the nodes and provides a high level of data availability. To this end, in general both the primary partitions and the secondary partitions are approximately evenly distributed among the computer nodes. Even distribution of the primary partitions generally facilitates workload balancing, while even distribution of the secondary partitions facilitates workload balancing during a failover condition after one or more nodes has failed.

In order to promote workload balance and provide k-safe data availability (ability to tolerate k simultaneous node failures, based on k secondary partitions corresponding to each primary partition), the placement algorithm generally complies with the following four criteria:

The primary copy and each secondary replica of any individual partition are located in different nodes The primary partitions are essentially evenly distributed among the nodes The secondary partitions are essentially evenly distributed among the nodes The secondary partitions are distributed to maximize diversity The first criterion generally avoids or minimizes data loss upon the failure of one or more nodes. The second and third criteria generally facilitate workload balancing. The fourth criterion promote workload balancing during a failover condition after the failure of one or more nodes. Here, diversity refers to the extent to which the primary partitions corresponding to the secondary partitions on a particular node are evenly distributed among other nodes. Although the placement algorithm attempts to comply with all four criteria whenever possible, strict compliance with the second, third and fourth criteria is not an absolute requirement.

Thus, during database initialization, once the information from the database has been grouped into partitions, the initial distributor 16 may store, or place, each of the partitions in one of the multiple computer nodes associated with the database according to the partition placement algorithm described in this disclosure. Subsequent queries requiring access to database records may be forwarded to the node where the partition containing the record has been stored.

Figure 3:
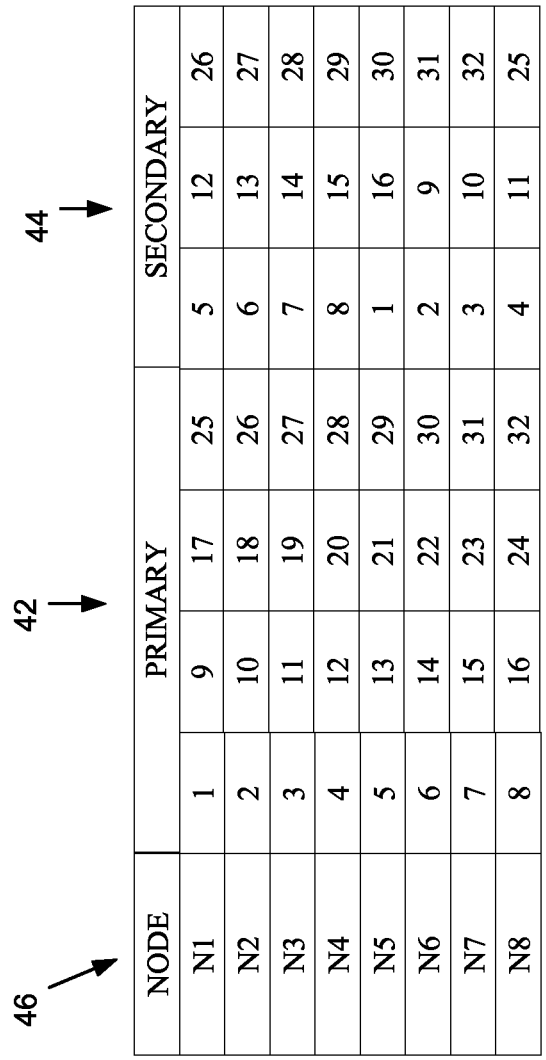
FIG. 3 is a table representing a distribution of primary partitions and secondary partitions among a cluster of computer nodes.

Referring to FIG. 3, as a specific example of partition placement during database initialization, a table 40 depicts the placement of primary partitions 42 and secondary partitions 44 among the nodes 46 of a cluster of servers associated with a database. Records from a database table have been grouped into thirty-two partitions, numbered 1 through 32. Primary copies and secondary replicas of each of the partitions are distributed among a cluster of eight computer nodes, designated N1 through N8. In order to achieve workload balancing, each of the nodes 46 is assigned four primary partitions 42 and four secondary partitions 44.

Thus, for example, using a round-robin placement algorithm to evenly distribute the primary partitions 42 among the nodes, node N1 is assigned the four primary partitions numbered 1, 9, 17 and 25; node N2 is assigned the four primary partitions numbered 2, 10, 18 and 26; node N3 is assigned the four primary partitions numbered 3, 11, 19 and 27; node N4 is assigned the four primary partitions numbered 4, 12, 20 and 28; node N5 is assigned the four primary partitions numbered 5, 13, 21 and 29; node N6 is assigned the four primary partitions numbered 6, 14, 22 and 30; node N7 is assigned the four primary partitions numbered 7, 15, 23 and 31; and node N8 is assigned the four primary partitions numbered 8, 16, 24 and 32.

Then, the secondary partitions 44 are evenly distributed among the nodes 46 using a modified round-robin placement algorithm. Each of the secondary partitions 44 is assigned to a node other than the node where the corresponding primary partition is stored. For example, the secondary partition corresponding to primary partition 1 stored on node N1 is stored on node N5. In addition, each of the secondary partitions 44 corresponding to the primary partitions 42 stored on an individual node preferably are stored on separate nodes 40. For example, the secondary partitions corresponding to primary partitions 1, 9, 17 and 25 stored on node N1 are stored on four separate nodes: N5, N6, N7 and N8. Similarly, secondary partitions 44 preferably are placed such that each of the primary partitions 42 corresponding to the secondary partitions 44 stored on an individual node are stored on separate nodes 46. For example, the primary partitions 42 corresponding to secondary partitions 5, 12, 19 and 26 stored on N1 are stored on four separate nodes: N5, N4, N3 and N2.

This placement algorithm generally ensures that at least of one of each corresponding pair of primary and secondary partitions 42, 44 remains on a surviving node after one node failure. If additional partition replicas are stored in compliance with the same criteria with respect to the corresponding primary partition and each of the corresponding secondary partitions, then the system can tolerate as many simultaneous node failures as the number of stored replicas of secondary partitions. Thus, if two secondary partition replicas are stored, the system can tolerate two simultaneous node failures with loss of data. That is to say, storage of k secondary partition replicas provides k-safe data availability.

In general, when a node leaves or joins a distributed file system cluster, data partitions need to be re-distributed, or transferred between nodes, in order to maintain or restore proper workload balance. It is important that the partition distribution continue to satisfy the four criteria described above after re-distribution has been performed.

Since the individual partitions may contain a large quantity of data, for example, ranging from multiple gigabytes to multiple terabytes, the redistribution procedure may potentially consume very significant network and storage bandwidth, which can temporarily affect query performance. Thus, minimizing the number of partitions in redistribution should be as important as workload balancing.

When a server node fails or becomes disconnected or otherwise disassociated from the network, the minimal number of partitions to be redistributed in order to restore data redundancy generally equals the total number of partitions that were stored in the failed or disconnected node. The primary partitions stored on the failed or disconnected node can no longer serve workload requests. For this reason, secondary partitions stored on other currently functioning nodes corresponding to the primary partitions stored on the failed or disconnected node are upgraded to primary status in response to detection of the node failure. This condition is referred to as failover.

Subsequent requests for primary partitions corresponding to the failed node are forwarded to the nodes where the corresponding secondary partitions are stored. New replicas are created of the secondary partitions that have been promoted to primary status in order to restore data redundancy after failover. The workload remains properly balanced during a failover condition, because the affected secondary partitions are evenly distributed across the remaining nodes during redistribution.

The placement algorithm described in this disclosure generally balances the workload in a failover condition after a node failure, when secondary partitions are upgraded to primary status and placed in surviving nodes. The redistribution workload should be evenly shared by all nodes. The placement algorithm described in this disclosure minimizes the number of partitions in redistribution, and achieves workload balancing both during and after redistribution while maintaining the level of data redundancy.

Referring to FIG. 4, as a specific example of partition placement during redistribution after a node has failed or left the cluster, a table 50 depicts the placement of primary partitions 52 and secondary partitions 54 among the nodes 56 of a cluster of servers associated with a database. Primary copies and secondary replicas of the thirty-two partitions from the configuration of FIG. 3 have been redistributed among the remaining seven computer nodes 56, designated N1 through N7, after node N8 of FIG. 3 has failed or left the cluster. In order to achieve workload balancing, each node 56 is assigned four or five primary partitions 52 and four or five secondary partitions 54.

Since the primary partitions numbered 8, 16, 24, and 32 that were stored on node N8 of FIG. 3 are no longer available after the failure or disconnect from the cluster network of node N8, the corresponding secondary partitions stored on nodes N4, N5, N6 and N7 are upgraded to primary status. As a result, nodes N1, N2 and N3 continue to store the same four primary partitions each as in the configuration of FIG. 3 before node N8 failed or became disconnected, while after the redistribution nodes N4, N5, N6 and N7 each store five primary partitions: node N1 continues to store the four primary partitions numbered 1, 9, 17 and 25; node N2 continues to store the four primary partitions numbered 2, 10, 18 and 26; node N3 continues to store the four primary partitions numbered 3, 11, 19 and 27; node N4 is assigned the five primary partitions numbered 4, 8, 12, 20 and 28; node N5 is assigned the five primary partitions numbered 5, 13, 16, 21 and 29; node N6 is assigned the five primary partitions numbered 6, 14, 22, 24 and 30; node N7 is assigned the four primary partitions numbered 7, 15, 23, 31 and 32.

Node N8 is no longer included in the cluster and does not currently store any partitions, while queries directed to partitions numbered 8, 16, 24 and 32 are redirected, or failed over, from node N8 to nodes N4, N5, N6 and N7, respectively. As soon as the four partitions numbered 8, 16, 24 and 32 have been upgraded to primary status, all of the database data continue to be available to database users.

At the point in time immediately after the four failover partitions have been upgraded from secondary status to primary status, no partition redistribution has been involved. However, the newly designated primary partitions numbered 8, 16, 24 and 32 do not initially have corresponding secondary partitions. In addition, the secondary partitions numbered 4, 11, 18 and 25 that previously were stored on node N8 are no longer available. As a result, eight secondary partitions (4, 8, 11, 16, 18, 24, 25 and 32) need to be duplicated and redistributed to other nodes in order to maintain data redundancy. This is the minimal number of redistributed partitions, since it is the number of partitions that were previously stored on node N8 before the node failed.

Once again, the secondary partitions are evenly distributed among the surviving nodes using a modified round-robin placement algorithm. Each secondary partition preferably is assigned to a node other than the node where the corresponding primary partition is stored. For example, the secondary partition corresponding to primary partition 8 now stored on node N4 is stored on node N6. The secondary partition numbered 8 preferably may not be placed on node N4, because the corresponding primary partition numbered 8 is located on node N4.

In addition, each of the secondary partitions corresponding to the primary partitions stored on an individual node preferably are stored on separate nodes. For example, the secondary partitions corresponding to primary partitions 4, 8, 12, 20 and 28 stored on node N4 are stored on five separate nodes: N5, N6, N1, N2 and N3, respectively. Similarly, secondary partitions preferably are placed such that each of the primary partitions corresponding to the secondary partitions stored on an individual node are stored on separate nodes. For example, the primary partitions corresponding to secondary partitions 3, 10, 16 and 17 stored on N7 are stored on four separate nodes: N3, N2, N5 and N1, respectively.

The redistribution is primarily driven by enforcement of the fourth criterion regarding the placement algorithm, that is, to maximize diversity, or the extent to which the primary partitions corresponding to the secondary partitions on a particular node are evenly distributed among other nodes. For example, in the modified round-robin approach, the first node encountered with regard to which diversity exists may be chosen for placement of the secondary partition being considered.

Thus, for example, as shown in FIG. 4, during redistribution after node N8 has failed the newly created secondary partition numbered 8 is placed on node N6 since diversity exists with respect to that secondary partition on N6. This secondary partition preferably may not be placed on node N1, because diversity does not exist with respect to this secondary partition on node N1, since the secondary partition numbered 12 located on node N1 corresponds to a primary partition on node N4, where the primary partition numbered 8 is placed.

Similarly, the secondary partition numbered 8 preferably may not be placed on nodes N2, N3, or N5, because diversity does not exist with respect to this secondary partition on these nodes, since the secondary partitions numbered 20, 28 and 4 located on nodes N2, N3 and N5, respectively, correspond to primary partitions on node N4. This approach represents a greedy algorithm, since the placement of an individual secondary partition is solely based on diversity with respect to that secondary partition. Thus, the result may not be global optimal.

During redistribution, an additional criteria may be applied regarding the partition placement algorithm based on the number of partitions transferred to or from an individual node during the redistribution, referred to as the degree of the node. Thus, in order to balance the workload during a redistribution, an array may be created representing the current degree value associated with each of the nodes in a database cluster. The array may be modified to reflect each movement, or transfer, of partitions to or from each node in the cluster. Thus, the degree array records the number of partition transfers from the perspective of each node.

As a specific example, during the redistribution of data partitions from the configuration of FIG. 3 to the configuration of FIG. 4, eight secondary partitions are replicated and distributed among the surviving seven nodes. Each partition placement affects two nodes: that is, one node sends the partition and another node receives the partition. Thus, in this example a total of eight partitions are sent and eight partitions are received. From the perspective of the individual nodes there are a total of sixteen send and receive operations, each of which results in the incrementation of the degree value associated with the affected node.

In order to balance the workload during redistribution, the maximum permissible degree of a node that is eligible to receive a secondary partition preferably equals one added to the total number of partition transfer operations divided by the number of surviving nodes (rounded down, or truncated, to the nearest whole number):

$$\text{degree}_{max} = trunc\left(\frac{\text{total no. of partition transfer transactions}}{\text{no. of surviving nodes}} + 1\right)$$

In this example, then, the maximum degree is three, as follows:

$$\text{degree}_{max} = trunc\left(\frac{(8+8)}{7} + 1\right) = 3$$

When choosing a node for placement of a secondary partition, preferably only those nodes that currently have not reached the maximum degree value are considered.

Referring now to FIG. 5, an exemplary degree array 60 is illustrated over time 62 (progressing vertically) during the redistribution placement in this example. Initially, all the nodes have zero degree. Then, as the redistribution ensues, the degree array element corresponding to each affected node is incremented each time the node is selected for placement of a secondary partition, as is the element corresponding to the node where the replicated partition is located.

Thus, for example, in the first of the redistribution placement steps 64 shown in FIG. 5, when the primary partition numbered 8 in node N4 is replicated and the secondary partition numbered 8 is placed in node N6, both the elements corresponding to N4 and to N6 are incremented to a value of one. Later, in placement step 6, when determining the placement of secondary partition 11, although the partition otherwise would be eligible for placement in node N4, the corresponding degree value has already reached the maximum of three for redistribution. As a result, N5 is instead selected for placement of the secondary partition 11.

When an additional server node is connected to the network, becomes newly associated with the cluster or the capacity of the cluster otherwise changes, data partitions generally require redistribution in order to restore workload balance among the current cluster of computer nodes. The minimal number of partitions to be redistributed in order to restore data redundancy can be calculated based on the total number of primary and secondary partitions and the number of nodes in the cluster.

For example, the minimum number of primary partitions to be transferred to the newly added node may be calculated as the truncated average number of primary partitions per node, and the same number of secondary partitions may also be transferred to the newly added node. Alternatively, the minimum total number of partitions to be transferred to the newly added node may be calculated as the truncated average total number of partitions per node, and these may be essentially evenly divided between primary and secondary partitions.

The specific primary partitions and secondary partitions to be moved to the newly inserted node may preferably be determined using the diversity of each partition in the original distribution before the insertion of the additional node. With regard to primary partitions, diversity is considered to be the same as that of the corresponding secondary partition, or equivalently, the diversity of the corresponding secondary partition is used for corresponding primary partition, as well. Thus, the disclosed approach, or placement algorithm, builds an array representing the diversity of each partition. Priority is given to partitions that lack diversity, or have diversity equal to zero, for transfer to the newly added node in order to increase the diversity of those partitions.

Figure 6:
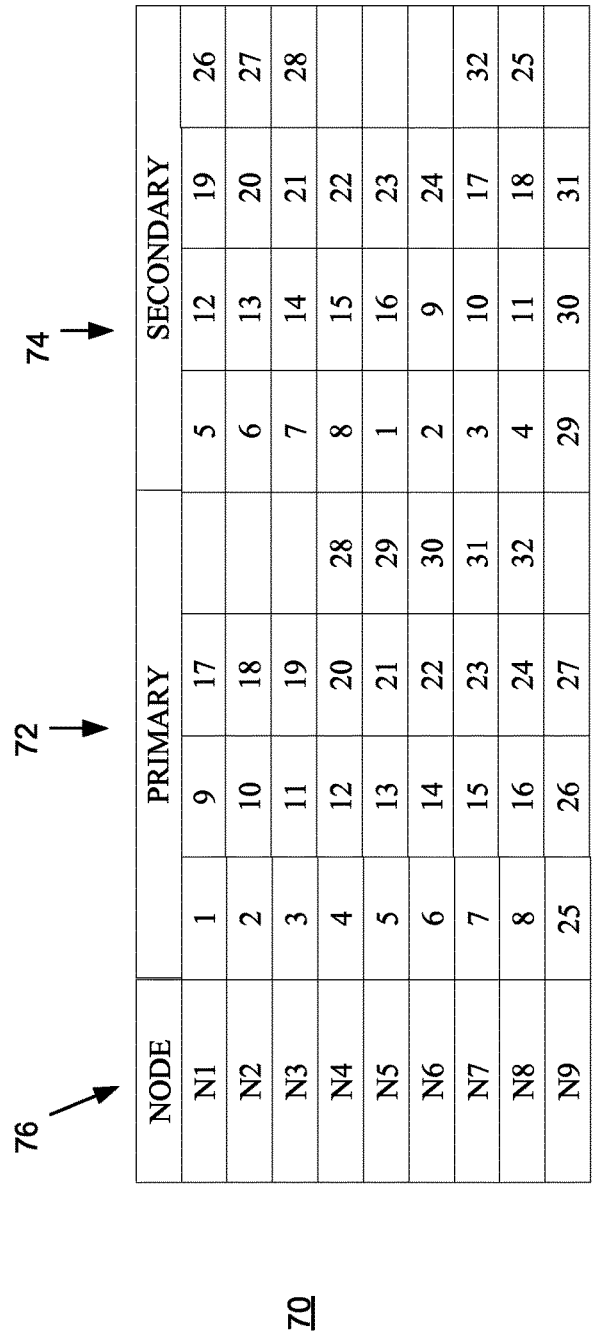
FIG. 6 is a table representing a redistribution of primary partitions and secondary partitions after the addition of a node to the cluster.

Referring to FIG. 6, as a specific example of partition placement during redistribution after a capacity change resulting when an additional node is inserted into the cluster, a table 70 depicts the placement of primary partitions 72 and secondary partitions 74 among the nodes 76 of a cluster of servers associated with a database. Primary copies and secondary replicas of the thirty-two partitions from the configuration shown in FIG. 3 have been redistributed among the current nine computer nodes 76, designated N1 through N9, after node N9 has been added to the cluster. In order to achieve workload balancing, each node is assigned three or four primary partitions and three or four secondary partitions. The minimal number of six partitions, three primary and three secondary, are placed on node N9.

The minimum number of three primary partitions are transferred to the newly added node N9 and the primary partitions are essentially evenly distributed among all the current cluster nodes using a modified round-robin placement algorithm. The last, or highest numbered, primary partition from each of the first three nodes from the configuration shown in FIG. 3, the primary partition numbered 25 from node N1, the primary partition numbered 26 from node N2 and the primary partition numbered 27 from node N3, are transferred to the newly added node N9 to populate the minimum number of primary partitions on the newly added server. In addition, the last, or highest numbered, secondary partition from each of the subsequent three nodes from the configuration shown in FIG. 3, the secondary partition numbered 29 from node N4, the secondary partition numbered 30 from node N5 and the secondary partition numbered 31 from node N6, are transferred to the newly added node N9 to populate the minimum number of secondary partitions on the newly added server.

As a result, nodes N4, N5, N6 and N7 continue to store the same four primary partitions each as in the configuration of FIG. 3 before node N9 was added to the cluster, while after the redistribution nodes N1, N2, N3 and N8 each store three primary partitions: node N1 is assigned the three primary partitions numbered 1, 9 and 17; node N2 is assigned the three primary partitions numbered 2, 10 and 18; node N3 is assigned the three primary partitions numbered 3, 11 and 19; node N4 continues to store the four primary partitions numbered 4, 12, 20 and 28; node N5 continues to store the four primary partitions numbered 5, 13, 21 and 29; node N6 continues to store the four primary partitions numbered 6, 14, 22 and 30; node N7 continues to store the four primary partitions numbered 7, 15, 23 and 31; node N8 continues to store the four primary partitions numbered 8, 16, 24 and 32. Newly added node N9 is assigned the three primary partitions numbered 25, 26 and 27.

Each placement complies with the applicable criteria regarding the placement algorithm described in this disclosure. Thus, each of the primary partitions, numbered 25, 26 and 27, assigned to the newly added node N9 is distinct from each of the secondary partitions, numbered 39, 30 and 31, assigned to the newly added node N9. In addition, each of the nodes, N1 through N9, stores three or four primary partitions along with three or four secondary partitions. Further, each of the primary partitions corresponding to the secondary partitions, numbered 29, 30 and 31, stored on the newly added node N9 are stored on separate nodes, N5, N6 and N7, respectively, which maintains diversity with regard to each of the secondary partitions.

Figure 7:
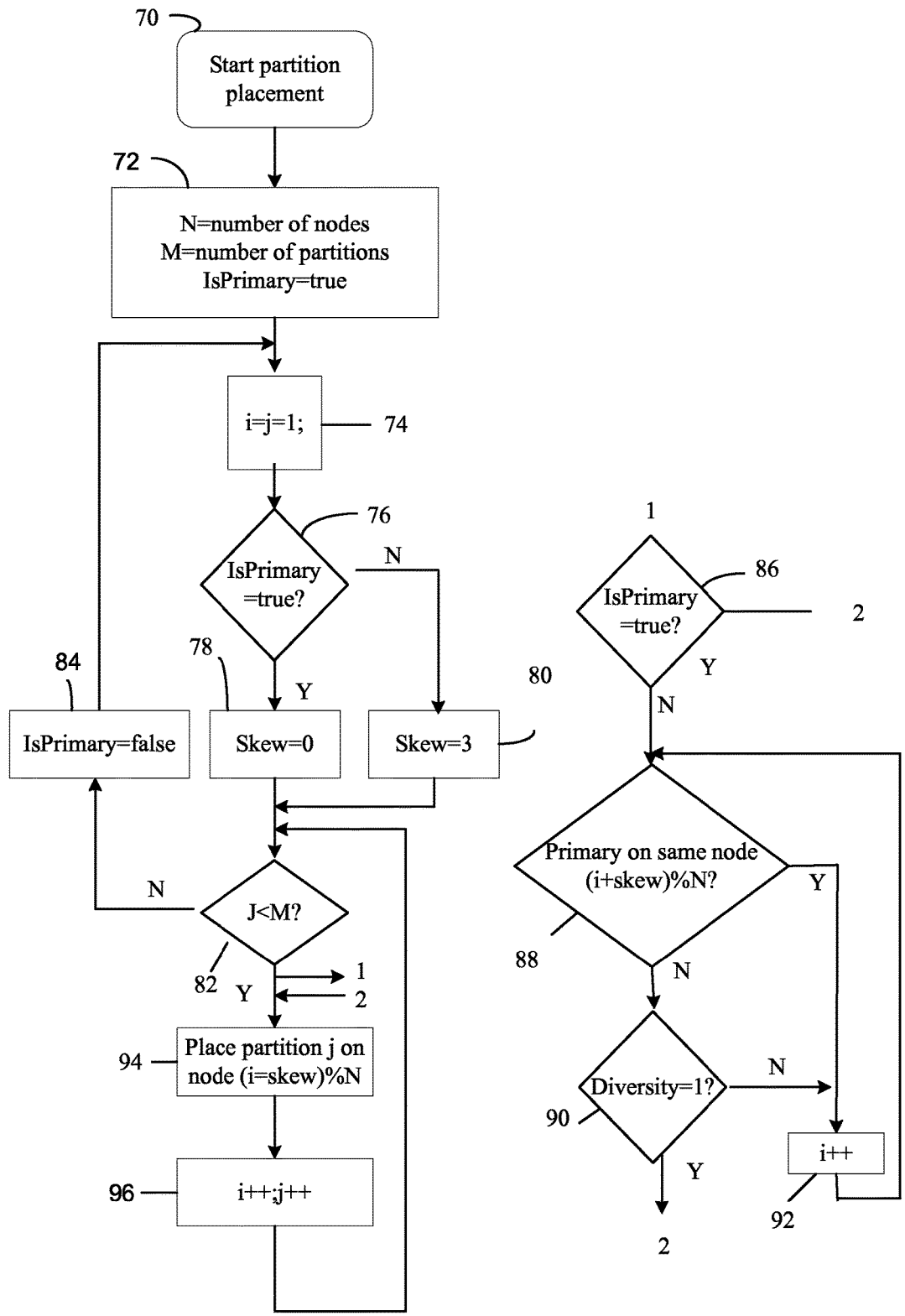
FIG. 7 is a flowchart showing a method of initially distributing data partitions among a cluster of computer nodes.

Referring now to FIG. 7, a process flow is illustrated that may be used by the apparatus 10 of FIG. 1 upon initialization of a database to implement the partition placement algorithm described in this disclosure. The process begins at block 70, "start partition placement." In block 72, a node number variable (for example, "N") is set equal to the number of nodes in a cluster of servers associated with a database, a partition number variable (for example, "M") is set equal to the number of data partitions created from records in the database, and a primary/secondary variable (for example, "IsPrimary=true") is set indicating that the partition currently under consideration is a primary partition. In block 74, two counting variables, the first indicating the node number currently under consideration (for example, "i") and the second indicating the partition number currently under consideration (for example, "j"), are set equal to the value "1."

In block 76, a determination is made regarding whether or not the partition currently under consideration is a primary partition. If so, then in block 78 a skew variable is set equal to the value "0." Otherwise, if the partition currently under consideration is not a primary partition, but rather is a secondary partition, then in block 80 the skew variable is set equal to the value "3." In either case, from block 78 or 80, the process proceeds to block 82, in which a determination is made regarding whether or not the partition number currently under consideration is less than or equal to the number of partitions previously set in block 72. If not (that is, if the partition number currently under consideration is greater than the number of partitions previously set in block 72), then in block 84 the primary/secondary variable is set indicting that the partition currently under consideration is not a primary partition, but rather, is a secondary partition, and the process continues at block 74, as explained above.

If, on the other hand, the determination in block 82 is that the partition number currently under consideration is less than or equal to the number of partitions previously set in block 72, then in block 86 a further determination is made regarding whether or not the partition currently under consideration is a primary partition. If not, but instead, the partition currently under consideration is a secondary partition, then in block 88 an analysis is performed to determine whether or not the corresponding primary partition containing the same data is stored on the node currently under consideration. If not, but rather, the corresponding primary partition is stored on another node, then in block 90 an analysis is performed regarding the diversity with respect to the other secondary partitions stored on the node currently under consideration.

Diversity refers to the extent to which the primary partitions that correspond to the secondary partitions on a particular node are stored on separate nodes. Complete, or maximum, diversity means that each of the primary partitions corresponding to the secondary partitions on a particular node are stored on separate individual nodes in the cluster. That is to say, no two primary partitions corresponding to the secondary partitions stored on a particular node are stored on any individual node in the cluster.

The analysis performed at block 90, may, for example, determine that diversity exists ("diversity=1") in the case that no primary node corresponding to any secondary node stored on the node under consideration is stored on the same node as the primary partition of the secondary partition under consideration for placement. Otherwise, for example, diversity may be determined not to exist ("diversity=0"). This approach is a greedy algorithm, in that it determines the placement of a particular secondary partition based solely on the diversity of that particular partition. Thus, the result may not be globally optimal. In an alternative embodiment, the analysis performed at block 90, may, for example, further determine that diversity exists when no two primary partitions corresponding to secondary partitions on the node under consideration are stored on any individual node in the cluster.

If diversity is determined to not exist in block 90, or, on the other hand, if the corresponding primary partition is determined in block 88 to be stored on the same node, then in block 92 the node number variable is augmented by an incremental value of one and the process continues at block 88. Otherwise, if diversity is determined to exist in block 90, or if the determination in block 82 is that the partition number currently under consideration is greater than the number of partitions previously set in block 72, then in block 94 the primary or secondary partition under consideration is placed on the node having the number resulting from performing a modulo operation on the value stored in the node number variable plus the value stored in the skew variable with respect to the value stored in the node number variable:

placement = (node number under consideration + skew) mod (number of nodes in the cluster)

= $(i + \text{skew}) \mod N$

Figure 8:
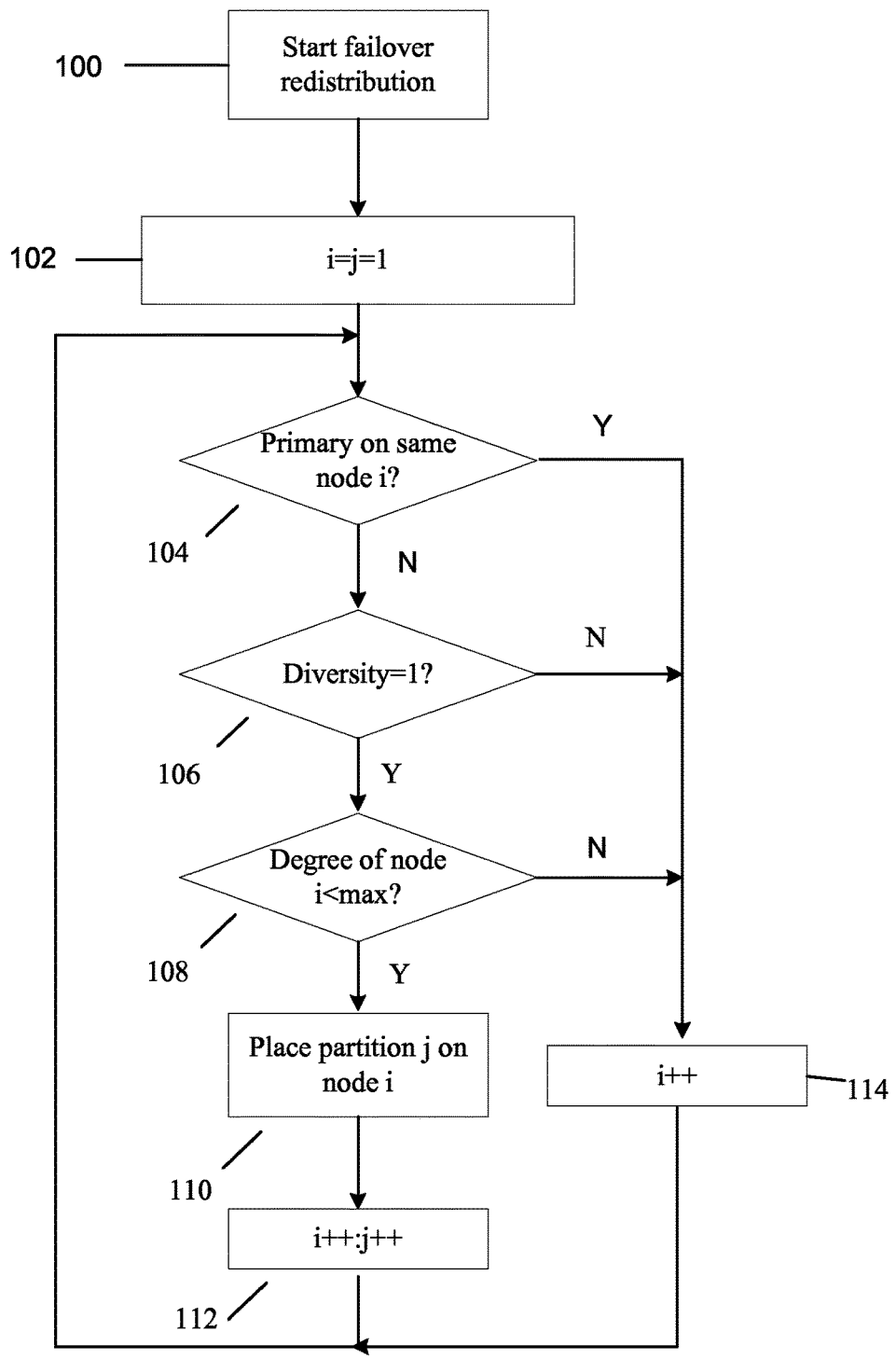
FIG. 8 is a flowchart showing a method of redistributing data partitions after a node failure.

Referring now to FIG. 8, a process flow is illustrated that may be used by the apparatus 10 of FIG. 1 after a node in a database cluster fails or becomes disconnected from the network in order to implement the partition placement algorithm described in this disclosure. Before the partition placement algorithm is performed after a node failure or disconnection, the secondary partitions that correspond to the primary partitions that previously were stored on the failed or disconnected node should be upgraded to primary status on the same nodes where those secondary partitions are stored. The following procedure then is performed with regard to each of the newly upgraded primary partitions as well as with regard to each of the secondary partitions that previously were stored on the failed or disconnected node upon replication of these partitions.

The secondary partition placement procedure begins at block 100, "start failover redistribution." In block 102, two counting variables, the first indicating the node number currently under consideration (for example, "i") and the second indicating the partition number currently under consideration (for example, "j"), are set equal to the value "1."

In block 104, an analysis is performed to determine whether or not the corresponding primary partition containing the same data as the secondary node currently under consideration is stored on the node currently under consideration. If not, but rather, the corresponding primary partition is stored on another node, then in block 106 an analysis is performed regarding the diversity with respect to the other secondary partitions stored on the node currently under consideration as described above in association with block 90. As above, the diversity analysis may, for example, determine that diversity exists ("diversity=1") in the case that no primary node corresponding to any secondary node stored on the node under consideration is stored on the same node as the primary partition of the secondary partition under consideration for placement.

If the analysis in block 106 determines that diversity exists with regard to the secondary partition currently under consideration, then in block 108 an analysis is performed regarding the current degree associated with the node currently under consideration, as described above. The degree analysis may, for example, determine that the node is eligible for partition placement if the current value for its degree is less than a maximum acceptable value. If the analysis in block 108 determines that the degree of the node under consideration has not reached the maximum acceptable degree, then in block 110 the secondary partition under consideration is placed on the node under consideration. In block 112, the node number and partition number counting variables are augmented by an incremental value of one in block 114 and the procedure continues with the next replicated partition at block 104.

Otherwise, if the analysis in block 104 determines the corresponding primary partition is stored on the same node, or if diversity is determined to not exist in block 106, or if the degree of the node under consideration is determined to have reached the maximum acceptable value in block 108, then the node number counting variable (i) is augmented by an incremental value of one in block 112 and the procedure continues by considering placement of the secondary partition on the next node at block 104.

Figure 9:
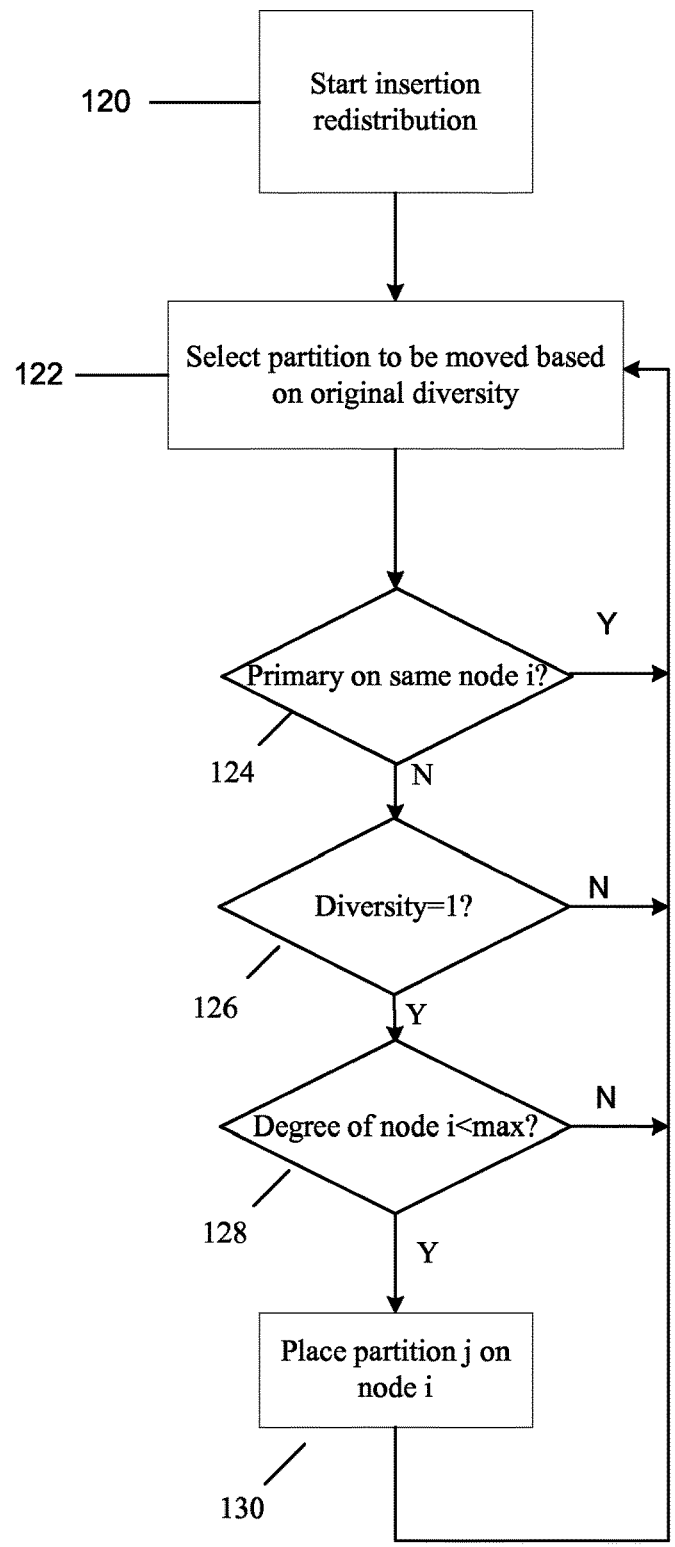
FIG. 9 is a flowchart showing a method of redistributing data partitions after the addition of a node to the cluster.

Referring now to FIG. 9, a process flow is illustrated that may be used by the apparatus 10 of FIG. 1 after an additional node has been inserted into a database cluster in order to implement the partition placement algorithm described in this disclosure. The following procedure is performed with regard to the minimum number of primary partitions to be transferred to the newly added node, as well as with regard to the minimum number of secondary partitions to be transferred to the newly added node. The process begins at block 120, "start insertion redistribution." In block 122, a secondary partition, "j," is selected to be moved to the newly added node, "i," based on a lack of diversity with regard to the secondary partition in its original or current location.

For example, the specific primary partitions and secondary partitions to be moved to the newly inserted node may preferably be determined using the diversity of each node in the original distribution before the insertion of the additional node. With regard to primary partitions, diversity is considered to be the same as that of the corresponding secondary partition, or equivalently, the diversity of the corresponding secondary partition is used for corresponding primary partition, as well. Thus, for example, an array may be created representing the diversity of each node, and priority may be given to partitions of nodes that lack diversity, or have diversity equal to zero, for transfer to the newly added node in order to increase the diversity of those nodes. Alternatively, a round-robin algorithm (not shown in FIG. 9) may be used to determine primary and secondary partitions for placement on the newly added node.

In block 124, if a primary partition being considered for transfer to the newly added node, a determination is made regarding whether or not the corresponding secondary partition containing the same data as the primary node currently under consideration is stored on the newly added node. Correspondingly, if a secondary partition is being considered for transfer to the newly added node, a determination is made regarding whether or not the corresponding primary partition containing the same data as the secondary node currently under consideration is stored on the newly added node.

If not, but rather, the corresponding primary or secondary partition is stored on another node, then in block 126 an analysis is performed regarding whether or not diversity exists with regard to the selected partition and other partitions stored on the newly added node. If the analysis in block 126 determines that diversity exists with regard to the partition currently under consideration, then in block 128 an analysis is performed regarding the current degree associated with the newly added node, as described above. The degree analysis may, for example, determine that the newly added node is eligible for partition placement if the current value for its degree is less than a maximum acceptable value.

If the analysis in block 128 determines that the degree of the newly added node has not reached the maximum acceptable degree, then in block 130 the partition under consideration is placed on the newly added node, and the procedure continues by selecting another primary or secondary partition to be considered for transfer to the newly added node at block 122. Otherwise, if the analysis in block 124 determines the corresponding primary or secondary partition is stored on the newly added node, or if diversity is determined to not exist in block 126, or if the degree of the newly added node is determined to have reached the maximum acceptable value in block 128, then the procedure continues by selecting another primary or secondary partition to be considered for transfer to the newly added node at block 122.

Aspects of this disclosure are described herein with reference to flowchart illustrations or block diagrams, in which each block or any combination of blocks can be implemented by computer program instructions. The instructions may be provided to a processor of a general purpose computer, special purpose computer, or other programmable data processing apparatus to effectuate a machine or article of manufacture, and when executed by the processor the instructions create means for implementing the functions, acts or events specified in each block or combination of blocks in the diagrams.

In this regard, each block in the flowchart or block diagrams may correspond to a module, segment, or portion of code that including one or more executable instructions for implementing the specified logical function(s). It should also be noted that, in some alternative implementations, the functionality associated with any block may occur out of the order noted in the figures. For example, two blocks shown in succession may, in fact, be executed substantially concurrently, or blocks may sometimes be executed in reverse order.

A person of ordinary skill in the art will appreciate that aspects of this disclosure may be embodied as a device, system, method or computer program product. Accordingly, aspects of this disclosure, generally referred to herein as circuits, modules, components or systems, may be embodied in hardware, in software (including firmware, resident software, micro-code, etc.), or in any combination of software and hardware, including computer program products embodied in a computer-readable medium having computer-readable program code embodied thereon.

In this respect, any combination of one or more computer readable media may be utilized, including, but not limited to, an electronic, magnetic, optical, electromagnetic, infrared, or semiconductor system, apparatus, or device, or any suitable combination of these. More specific examples of computer readable storage media would include the following non-exhaustive list: a portable computer diskette, a hard disk, a random access memory (RAM), a read-only memory (ROM), an erasable programmable read-only memory (EPROM), a Flash memory, a portable compact disc read-only memory (CD-ROM), an optical storage device, network-attached storage (NAS), a storage area network (SAN), magnetic tape, or any suitable combination of these. In the context of this disclosure, a computer readable storage medium may include any tangible medium that is capable of containing or storing program instructions for use by or in connection with a data processing system, apparatus, or device.

Computer program code for carrying out operations regarding aspects of this disclosure may be written in any combination of one or more programming languages, including object oriented programming languages such as Java, Smalltalk, C++, or the like, as well as conventional procedural programming languages, such as the "C," FORTRAN, COBOL, Pascal, or the like. The program code may execute entirely on an individual personal computer, as a stand-alone software package, partly on a client computer and partly on a remote server computer, entirely on a remote server or computer, or on a cluster of distributed computer nodes. In general, a remote computer, server or cluster of distributed computer nodes may be connected to an individual (user) computer through any type of network, including a local area network (LAN), a wide area network (WAN), an Internet access point, or any combination of these.

It will be understood that various modifications may be made. For example, useful results still could be achieved if steps of the disclosed techniques were performed in a different order, and/or if components in the disclosed systems were combined in a different manner and/or replaced or supplemented by other components. Accordingly, other implementations are within the scope of the following claims.

What is claimed is:

1. A method for distributing a plurality of data partitions among a plurality of computer nodes, comprising:
   dividing a database into a plurality of primary partitions;
   storing each of the primary partitions on a respective node of a plurality of nodes so that the primary partitions are distributed substantially evenly among the nodes and wherein the primary partitions are available to serve a system workload;
   duplicating each of the primary partitions to create corresponding respective secondary partitions;
   for each of the secondary partitions:
      identifying a node of the plurality of nodes that does not store the primary partition corresponding to the secondary partition; and
      storing the secondary partition on the identified node;
   after failure or dissociation of one node of the plurality of nodes, upgrading one or more secondary partitions corresponding to one or more primary partitions of the failed or dissociated node to primary status; and
   redistributing one or more secondary partitions corresponding to the one or more primary partitions of the failed or dissociated node by performing operations including:
      duplicating the one or more upgraded secondary partitions to create one or more corresponding further secondary partitions; and
      for each of the one or more corresponding further secondary partitions, identifying a further node of the plurality of nodes that does not store the upgraded secondary partition corresponding to the further secondary partition and wherein storage of the corresponding further secondary partition on the further node would not result in two or more of the secondary partitions, including the one or more further secondary partitions, stored on the further node being stored together as primary partitions on a common node; and
      storing the corresponding further secondary partition on the identified further node.

2. The method of claim 1, wherein:
   the storing of the primary partitions on the nodes uses a round-robin algorithm; and the identifying of the node of the plurality of nodes uses a modified round-robin algorithm that selects, as the identified node, a first node provided by the round-robin algorithm for which storage of the secondary partition on the identified node would not result the secondary partition and the primary partition corresponding to the secondary partition being stored together on the identified node.

3. The method of claim 1, further comprising:
determining a number of transfers of data partitions to and from a first node during the redistribution each of the one or more secondary partitions; and
determining that the number of transfers does not exceed a threshold and, based thereon, storing the corresponding further secondary partition on the first node, wherein the storing is part of the redistribution after the failed or disassociated node has failed or has become disassociated from a cluster.

4. The method of claim 3, further comprising upgrading a second secondary partition on a second node to be a primary partition on the second node, wherein the second node is a surviving node that remains available after the failed or disassociated node has failed or has become disassociated from the cluster.

5. The method of claim 3, wherein storing the corresponding further secondary partition on the first node further comprises determining that storage of the corresponding further secondary partition on a second node would result in two or more of the secondary partitions of the second node being stored together as primary partitions on a common node and, based thereon, storing the corresponding further secondary partition on the first node.

6. The method of claim 1, wherein identifying the node of the plurality of nodes that does not store the primary partition corresponding to the secondary partition further includes determining that storage of the secondary partition on the identified node would not result in two or more of the secondary partitions stored on the identified node being stored together as primary partitions on another node.

7. A computer-readable medium storing instructions for distributing a plurality of data partitions among a plurality of computer nodes, that when executed by one or more processors cause the processors to perform operations comprising:
dividing a database into a plurality of primary partitions;
storing each of the primary partitions on a respective node of a plurality of nodes so that the primary partitions are distributed substantially evenly among the nodes and wherein the primary partitions are available to serve a system workload;
duplicating each of the primary partitions to create corresponding respective secondary partitions;
for each of the secondary partitions:
identifying a node of the plurality of nodes that does not store the primary partition corresponding to the secondary partition; and
storing the secondary partitions on the identified node;
after failure or disassociation of a node of the plurality of nodes, upgrading one or more secondary partitions corresponding to one or more primary partitions of the failed or disassociated node to primary status; and
redistributing secondary partitions corresponding to the one or more primary partitions of the failed or disassociated node by causing the processors to perform operations including:
duplicating the one or more upgraded secondary partitions to create one or more corresponding further secondary partitions; and
for each of the one or more corresponding further secondary partitions, identifying a further node of the plurality of nodes that does not store the upgraded secondary partition corresponding to the further secondary partition and wherein storage of the corresponding further secondary partition on the further node would not result in two or more of the secondary partitions, including the one or more further secondary partitions, stored on the further node being stored together as primary partitions on a common node; and
storing the corresponding further secondary partition on the identified further node.

8. The computer-readable medium of claim 7, wherein:
the storing of the primary partitions on the nodes uses a round-robin algorithm; and
the identifying of the node of the plurality of nodes uses a modified round-robin algorithm that selects, as the identified node, a first node provided by the round-robin algorithm for which storage of the secondary partition on the identified node would not result in the secondary partition and the primary partition corresponding to the secondary partition being stored together on the identified node.

9. The computer-readable medium of claim 7, wherein the operations further comprise:
determining a number of transfers of data partitions to and from a first node during the redistribution of the secondary partitions; and
determining that the number of transfers does not exceed a threshold and, based thereon, storing the corresponding further secondary partition on the first node, wherein the storing is part of the redistribution after the failed or disassociated node has failed or has become disassociated from a cluster.

10. The computer-readable medium of claim 7, wherein the operations further comprise upgrading a second secondary partition on a second node to be a primary partition on the second node, wherein the second node is a surviving node that remains available after the failed or disassociated node has failed or has become disassociated from a cluster.

11. The computer-readable medium of claim 9, wherein the operations further comprise:
determining that storage of the corresponding further secondary partition on a second node would result in two or more of the secondary partitions of the second node being stored together as primary partitions on a common node and, based thereon, storing the corresponding further secondary partition on the first node.

12. The computer-readable medium of claim 7, wherein the instructions that cause the processor to identify the node of the plurality of nodes that does not store the primary partition corresponding to the secondary partition, further cause the processors to perform an operation comprising, determining that storage of the secondary partition on the identified node would not result in two or more of the secondary partitions stored on the identified node being stored together as primary partitions on another node.

13. A device for distributing a plurality of data partitions among a plurality of computer nodes, comprising:
computer-readable memory comprising instructions and one or more processors in communication with the memory, wherein the one or more processors are configured to execute the instructions to perform operations comprising:

dividing a database into a plurality of primary partitions;

storing each of the primary partitions on a respective node of a plurality of nodes so that the primary partitions are distributed substantially evenly among the nodes and wherein the primary partitions are available to serve a system workload;

duplicating each of the primary partitions to create corresponding respective secondary partitions;

for each of the secondary partitions:
  identifying a node of the plurality of nodes that does not store the primary partition corresponding to the secondary partition; and
  storing the secondary partition on the identified node;

after failure or disassociation of a node of the plurality of nodes, upgrading one or more secondary partitions corresponding to one or more primary partitions of the failed or disassociated node to primary status; and redistributing secondary partitions corresponding to the one or more primary partitions of the failed or disassociated node, the redistributing including:
  duplicating the one or more upgraded secondary partitions to create one or more corresponding further secondary partitions; and
  for each of the one or more corresponding further secondary partitions, identifying a further node of the plurality of nodes that does not store the upgraded secondary partition corresponding to the further secondary partition and wherein storage of the corresponding further secondary partition on the further node would not result in two or more of the secondary partitions, including the one or more further secondary partitions, stored on the further node being stored together as primary partitions on a common node; and
  storing the corresponding further secondary partition on the identified further node.

14. The device of claim 13, wherein:
the storing of the primary partitions on the nodes uses a round-robin algorithm; and
the identifying of the node of the plurality of nodes uses a modified round-robin algorithm that selects, as the identified node, a first node provided by the round-robin algorithm for which storage of the secondary partition on the identified node would not result in the secondary partition and the primary partition corresponding to the secondary partition being stored together on the identified node.

15. The device of claim 13, wherein the operations further comprise:
determining a number of transfers of data partitions to and from a first node during the redistribution of the secondary partitions; and
determining that the number of transfers does not exceed a threshold and, based thereon, storing the corresponding further secondary partition on the first node, wherein the storing is part of the redistribution after the failed or disassociated node has failed or has become disassociated from a cluster.

16. The device of claim 15, wherein the operations further comprise upgrading a second secondary partition on a second node to be a primary partition on the second node, wherein the second node is a surviving node that remains available after the failed or disassociated node has failed or has become disassociated from the cluster.

17. The device of claim 15, wherein the operations further comprise:
determining that storage of the corresponding secondary partition on a second node would result in two or more of the secondary partitions of the second node being stored together as primary partitions on a common node and, based thereon, storing the corresponding secondary partition on the first node.

18. The device of claim 15, wherein storing the corresponding further secondary partition on the first node further comprises determining that storage of the corresponding further secondary partition on a second node would result in two or more of the secondary partitions of the second node being stored together as primary partitions on a common node and, based thereon, storing the corresponding further secondary partition on the first node.

19. The device of claim 13, wherein execution of the instructions to perform the operation of identifying a node of the plurality of nodes that does not store the primary partition corresponding to the secondary partition, further perform the operation of determining that storage of the secondary partition on the identified node would not result in two or more of the secondary partitions stored on the identified node being stored together as primary partitions on another node.

* * * * *